(12) United States Patent
Messick et al.

(10) Patent No.: US 11,669,151 B1
(45) Date of Patent: Jun. 6, 2023

(54) METHOD FOR DYNAMIC FEATURE ENABLEMENT BASED ON POWER BUDGETING FORECASTING

(71) Applicant: Dell Products L.P., Round Rock, TX (US)

(72) Inventors: Douglas Evan Messick, Austin, TX (US); Vaishnavi Suchindran, Bangalore (IN); Alexander J. Hoganson, Austin, TX (US); Arun Muthaiyan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/556,439

(22) Filed: Dec. 20, 2021

(51) Int. Cl.
*G06F 1/00* (2006.01)
*G06F 1/3296* (2019.01)

(52) U.S. Cl.
CPC .................................. *G06F 1/3296* (2013.01)

(58) Field of Classification Search
CPC ...................................................... G06F 1/3296
See application file for complete search history.

(56) References Cited

U.S. PATENT DOCUMENTS

| 10,871,818 B1* | 12/2020 | De La Cropte De Chanterac ...... G06F 1/325 |
| 2008/0022140 A1* | 1/2008 | Yamada ................ G06F 1/3237 713/300 |
| 2009/0327764 A1* | 12/2009 | Brey ...................... G06F 1/3203 713/300 |
| 2012/0209442 A1* | 8/2012 | Ree ...................... H04W 52/367 700/295 |
| 2014/0143557 A1* | 5/2014 | Kuesel .................... H04L 12/10 713/300 |
| 2014/0143558 A1* | 5/2014 | Kuesel ..................... G06F 1/26 713/300 |
| 2016/0246754 A1* | 8/2016 | Rao ..................... G06F 13/4068 |

* cited by examiner

*Primary Examiner* — Mohammed H Rehman
(74) *Attorney, Agent, or Firm* — Womble Bond Dickinson (US) LLP

(57) ABSTRACT

Methods and systems for power management are disclosed. The disclosed power management method and systems may improve the likelihood of data processing systems providing desired computer implemented services while meeting power budget goals and/or other types of goals regarding power consumption, use, and/or provisioning. To improve the likelihood of the power budgets being met, the system may dynamically update power allocations to various components of data processing systems. The power allocations may be dynamically allocated by predicting how changes in existing power allocations may impact the ability of the data processing system to service power allocation requests. If it appears that changes in one or more existing power allocations may allow a power allocation request to be serviced, then the power allocations may be dynamically reallocated to free allocable power. The freed allocable power may be used to service the power allocation.

19 Claims, 16 Drawing Sheets

METHOD FOR DYNAMIC FEATURE ENABLEMENT BASED ON POWER BUDGETING FORECASTING

FIELD OF THE DISCLOSURE

Embodiments disclosed herein generally relate to power management. More particularly, embodiments disclosed herein relate to systems and methods to dynamically manage power consumption.

BACKGROUND

Computing devices may store data and used stored data when performing computations. For example, computing devices may utilize data when providing computer implemented services. To provide the computer implemented services, the computing devices may consume electrical power to perform the computations. The electrical power may be obtained from a variety of sources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
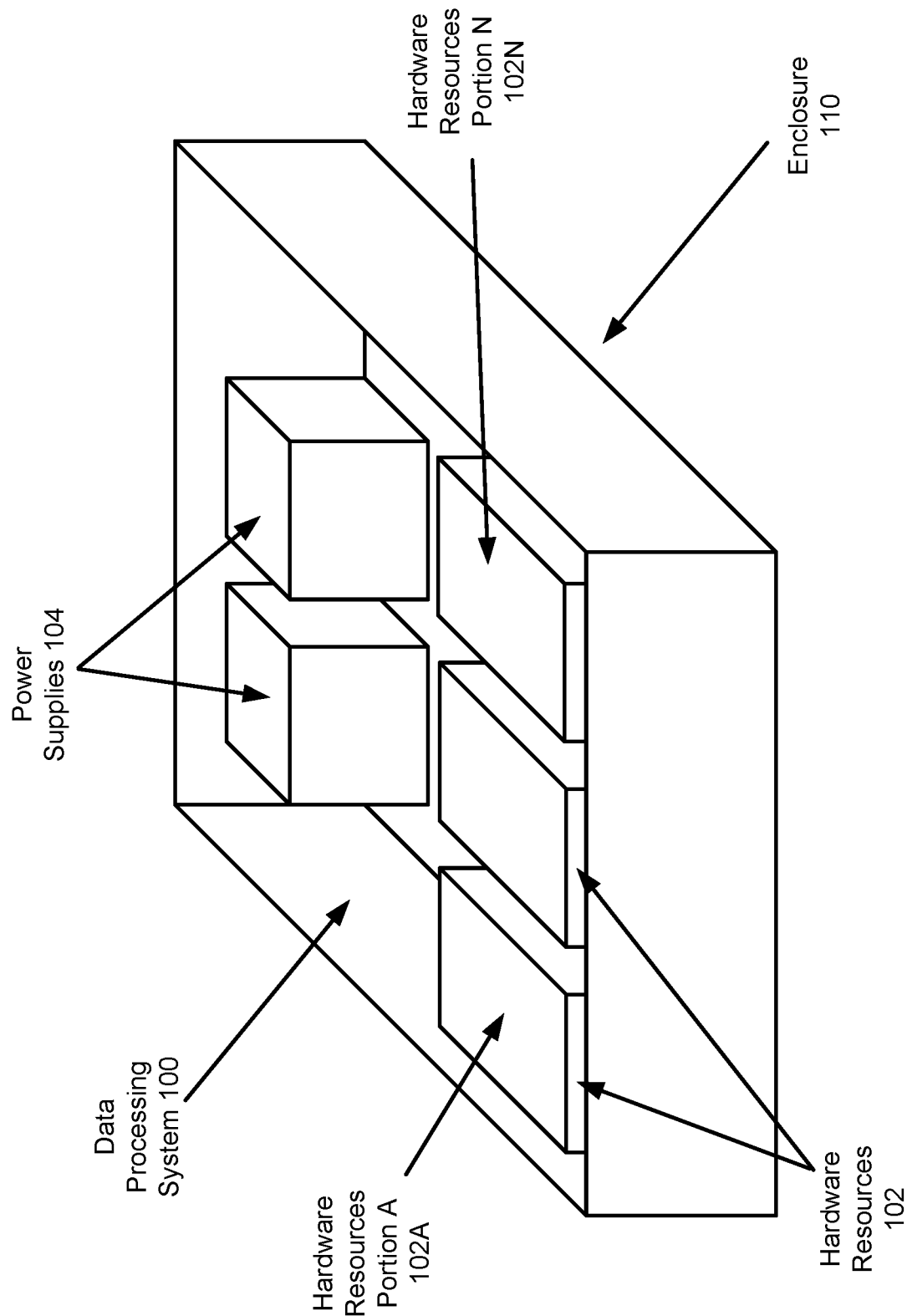
FIG. 1 shows a diagram illustrating a system in accordance with an embodiment.

Various embodiments and aspects of the disclosure will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments of the invention relate to methods and systems for power management. Specifically, the disclosed power management method and systems may improve the likelihood of data processing systems providing desired computer implemented services while meeting power budget goals and/or other types of goals regarding power consumption, use, and/or provisioning.

To improve the likelihood of the power budgets being met, the system may dynamically update power allocations to various components of data processing systems. The power allocations may be dynamically allocated by predicting how changes in existing power allocations may impact the ability of the data processing system to service power allocation requests. If it appears that changes in one or more existing power allocations may allow a power allocation request to be serviced (e.g., when it is otherwise not able to be serviced without violating a power budget or other goal), then the power allocations may be dynamically reallocated to free allocable power. The freed allocable power may be used to service the power allocation request (e.g., that would otherwise not be serviced thereby delaying and/or prevent computer implemented services to be provided).

To facilitate dynamic power allocation and/or power allocation reconfiguration, a system power manager may obtain information regarding modifications that may be made to previously made power allocations (e.g., when the allocations are made). This information may be used by the system power manager to ascertain whether reconfiguration of existing power allocations may serve to allow otherwise unserviceable power allocation requests to be serviced without violating power budgets or other power related goals.

By doing so, the likelihood of desired computer implemented services being provided by data processing devices may be improved. Further, the cognitive burden on administrator or other persons to manage data processing system may be greatly reduced by removing the burden of dynamically making power allocation decisions.

In an embodiment, a data processing system to provide computer implemented services is provided. The data processing system may include hardware resources portions; and a system power manager adapted to: obtain a power allocation request for a first hardware resources portion of the hardware resources portions, the power allocation request indicating a quantity of power to be allocated to the first hardware resources portion; make a determination that the power allocation request cannot be serviced without violating a power budget for the data processing system; in response to the determination: make a second determination that the power allocation request can be serviced while complying with a modified power budget for the data processing system; in response to the second determination: reconfigure one or more existing power allocations of the power budget to obtain: a potential power allocation sufficient to service the power allocation request without violating the modified power budget, and the modified power budget; and make a power allocation for the first hardware resources portion using the potential power allocation to: service the power allocation request, and obtain a second modified power budget for the data processing system.

Reconfiguring the one or more existing power allocations may include identifying a portion of power allocations specified by the power budget that may be modified to free power capacity of the power budget; selecting a sub-portion of the portion of the power allocations based on a quantity of power to service the power allocation request; reconfiguring operation of a portion of the hardware resources portions associated with the sub-portion of the portion of the power allocations to reduce power consumption; and updating the power budget based on the reduced power consumption to obtain the modified power budget for the data processing system, the modified power budget indicating the potential power allocation.

Reconfiguring operation of the portion of the hardware resources portions may include for a hardware resources portion of the portion of hardware resources portions: instructing a local power manager of the hardware resources portion to consumed a reduced quantity of power; and waiting a predetermined quantity of time after the instructing or waiting until an acknowledgement indicating that the local power manager has reconfigured the hardware resources portion to consume the reduced quantity of power.

The local power manager may include an out of band manager that is adapted to manage power consumption by the hardware resources portion by modifying operation of hardware components of the hardware resources portion.

Hardware resources portions may be adapted to limit respective power consumption rates based on instructions from the system power manager.

The system power manager may include a chassis manager and the hardware resources portions correspond to sleds hosted by a chassis in which the data processing system is positioned.

Reconfiguring the one or more existing power allocations of the power budget may include placing all of the hardware resources portions that are operating into a low power consumption operating state.

The hardware resources portions that are operating are performing a startup prior to handing management of the operation of the respective hardware resources portions to a management entity. The management entity may be an operating system.

A power supply that exclusively supplies power to the hardware resources portions may be configured to supply less power than is required to power all of the hardware resources portions during the startup while the hardware resources portions are not operating in a reduced power state.

The power supply may be further configured to supply sufficient power to power all of the hardware resources portions during the startup while the hardware resources portions are operating in a reduced power state.

The modified power budget may be based on the hardware resources portions operating in the reduced power state.

In an embodiment, a method of managing power consumption by a data processing system is provided. The method may include obtaining a power allocation request for a first hardware resources portion of hardware resources portions of the data processing system, the power allocation request indicating a quantity of power to be allocated to the first hardware resources portion; making a determination that the power allocation request cannot be serviced without violating a power budget for the data processing system; in response to the determination: making a second determination that the power allocation request can be serviced while complying with a modified power budget for the data processing system; in response to the second determination: reconfiguring one or more existing power allocations of the power budget to obtain: a potential power allocation sufficient to service the power allocation request without violating the modified power budget, and the modified power budget; and making a power allocation for the first hardware resources portion using the potential power allocation to: service the power allocation request, and obtaining a second modified power budget for the data processing system.

Reconfiguring the one or more existing power allocations may include identifying a portion of power allocations specified by the power budget that may be modified to free power capacity of the power budget; selecting a sub-portion of the portion of the power allocations based on a quantity of power to service the power allocation request; reconfiguring operation of a portion of the hardware resources portions associated with the sub-portion of the portion of the power allocations to reduce power consumption; and updating the power budget based on the reduced power consumption to obtain the modified power budget for the data processing system, the modified power budget indicating the potential power allocation.

Reconfiguring operation of the portion of the hardware resources portions may include for a hardware resources portion of the portion of hardware resources portions: instructing a local power manager of the hardware resources portion to consumed a reduced quantity of power; and waiting a predetermined quantity of time after the instructing or waiting until an acknowledgement indicating that the local power manager has reconfigured the hardware resources portion to consume the reduced quantity of power.

The local power manager may include an out of band manager that is adapted to manage power consumption by the hardware resources portion by modifying operation of hardware components of the hardware resources portion.

In an embodiment, a non-transitory computer readable medium storing instructions that, when executed by a processor, cause a method for managing power consumption by a data processing system to be performed is provided. The method may be similar to that discussed above.

Turning to FIG. 1, a diagram illustrating a system in accordance with an embodiment is shown. The system shown in FIG. 1 may be used to provide computer implemented services. The system may include, but is not limited to, data processing system 100 and enclosure 110. Each of these components is discussed below.

Data processing system 100 may provide the computer implemented services. When doing so, data processing system 100 may consume electrical power from other sources (e.g., via power supplies 104 which may obtain power from a utility or other source). To provide the computer implemented services, data processing system 100 may include hardware resources 102 and power supplies 104.

Hardware resources 102 may include any number of physical devices (e.g., processors, memory modules, storage devices, communications devices, etc.) that provide computing resources (e.g., processor cycles, transitory storage, persistent storage, communications bandwidth, etc.) usable to provide the computer implemented services. The computing resources may be used to support applications (e.g., computing instructions executing with the computing resources) hosted by data processing system 100. The applications may provide the computer implemented services. The computer implemented services may include any type and quantity of computer implemented services such as, for example, database services, data storage services, electronic communications services, etc.

When operating, hardware resources 102 may consume electrical power to provide the computing resources used to provide the computer implemented services. The hardware resources may utilize power from power supplies 104. Power supplies may include any number of physical devices (e.g., transformers, current/voltage sensors, controllers, etc.) usable to obtain power from power sources (not shown) and provide conditioned power to hardware resources 102 and/or other components. The power obtained from the power sources may be any form of power (e.g., alternating current, direct current) but the conditioned power may have specific characteristics (e.g., direct current of a predetermined voltage level) based on the hardware resources 102. For example, hardware resources 102 may not operate as expected when hardware resources 102 are provided with power that is not conditioned power.

The capacity for providing conditioned power to hardware resources 102 may be limited by power supplies 104, sources of power external to the data processing, and/or other factors. However, hardware resources 102 may be capable of drawing a quantity of power from power supplies 104 that exceeds a predetermined limit (e.g., a power budget).

In general, embodiments disclosed herein may provide systems, devices, and/or methods for managing power consumption of a data processing system. To manage the power consumption, the data processing system may actively identify power allocations to various hardware resources portions 102A-102N and potential modifications to the power allocation (e.g., collectively "hardware resources power information"). The hardware resources power information may be used to manage power consumption.

For example, to manage power consumption various hardware resources portions 102A-102N may request that portions of a power budget, adhered to by data processing system 100, be allocated to the respective hardware resources portions 102A-102N. However, as noted above, power supplies 104 may not be capable of providing a quantity of power requested by the hardware resources portions 102A-102N under all operating conditions. Thus, the power budget may not always include sufficient allocable power to satisfy all power allocation requests.

To service power allocation requests, data processing system 100 may reallocate or otherwise modify existing power allocations when a power allocation request that cannot be serviced with allocable power from the power budget is obtained to free additional allocable power. Once freed, data processing system 100 may service the power allocation request using, at least in part, the newly freed allocable power. In this manner, embodiments disclosed herein may facilitate operation of hardware resources 102 during a variety of operating conditions (e.g., during startup processes, during nominal operation, etc.) through power allocation even when insufficient power is available to service all of the requested power allocations.

For example, consider a scenario where data processing system 100 is powered on from an off state. When powered on, hardware resources portions 102A-102N may need to go through a startup process to reach a predetermined operating state prior to being able to provide (all or a portion of) desired computer implemented services. The startup process performed by hardware resources portions 102A-102N may be performed in multiple manners with different corresponding power consumption rates. When powered on and prior to consuming power, hardware resources portion 102A-102N may request that portions of a power budget be allocated to them so that they are able to perform their respective startup processes. When such requests are received, they may each be respectively processed and serviced by allocating allocable power from the power budget until insufficient allocable power is available in the power budget to be allocated to service the remaining requests. Once insufficient allocable power is available, data processing system 100 may reconfigure the power allocations to the hardware resources portions to which power has already been allocated to free additional allocable power to service the remaining power allocation requests. In this manner, all of hardware resources portions 102A-102N may be more likely to reach their desired operating states when compared to other method of managing the operation of data processing system 100.

Enclosure 110 may include a physical structure for housing data processing system 100. The physical structure may be a form factor compliant structure such as, for example, a rack mount enclosure for a server. The physical structure may be other types of structures for housing data processing systems without departing from embodiments disclosed herein.

Figure 2A:
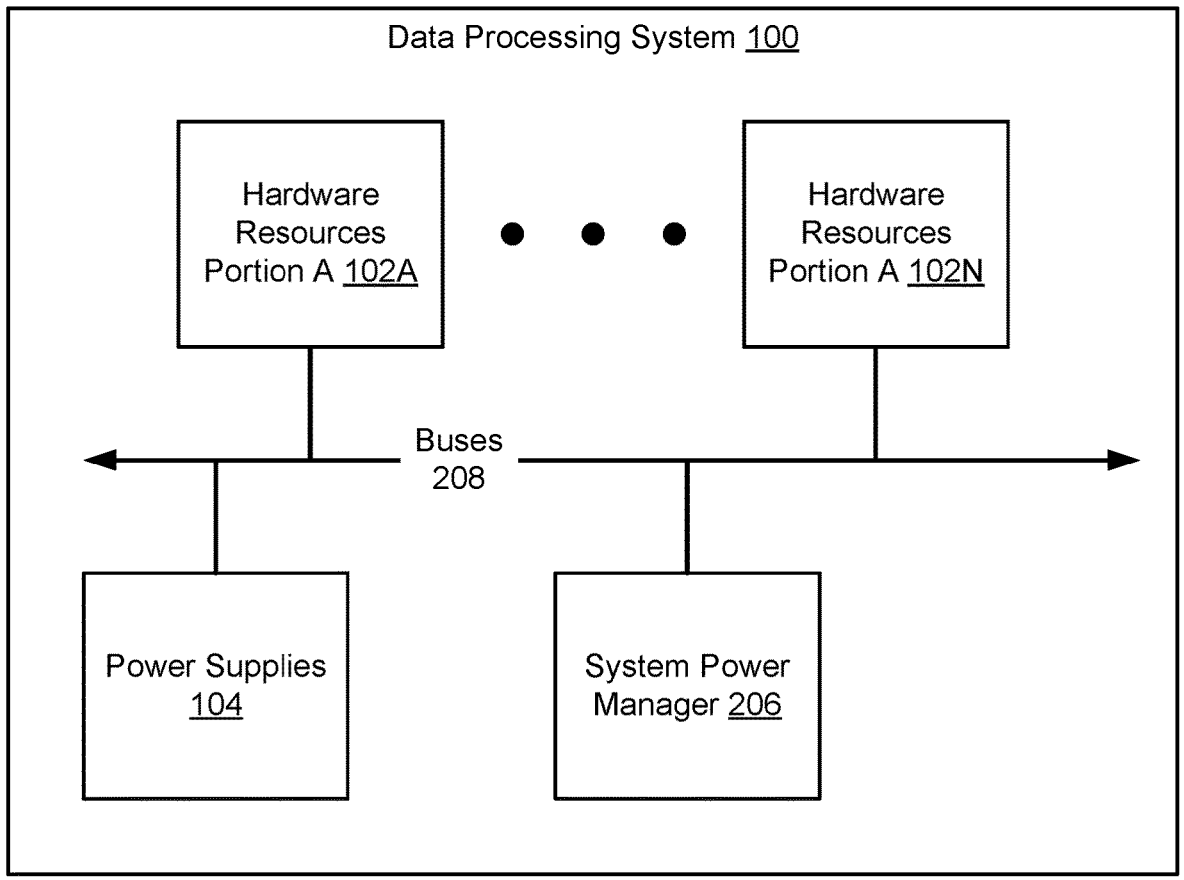
FIG. 2A shows a block diagram illustrating a data processing system in accordance with an embodiment.
Figure 2B:
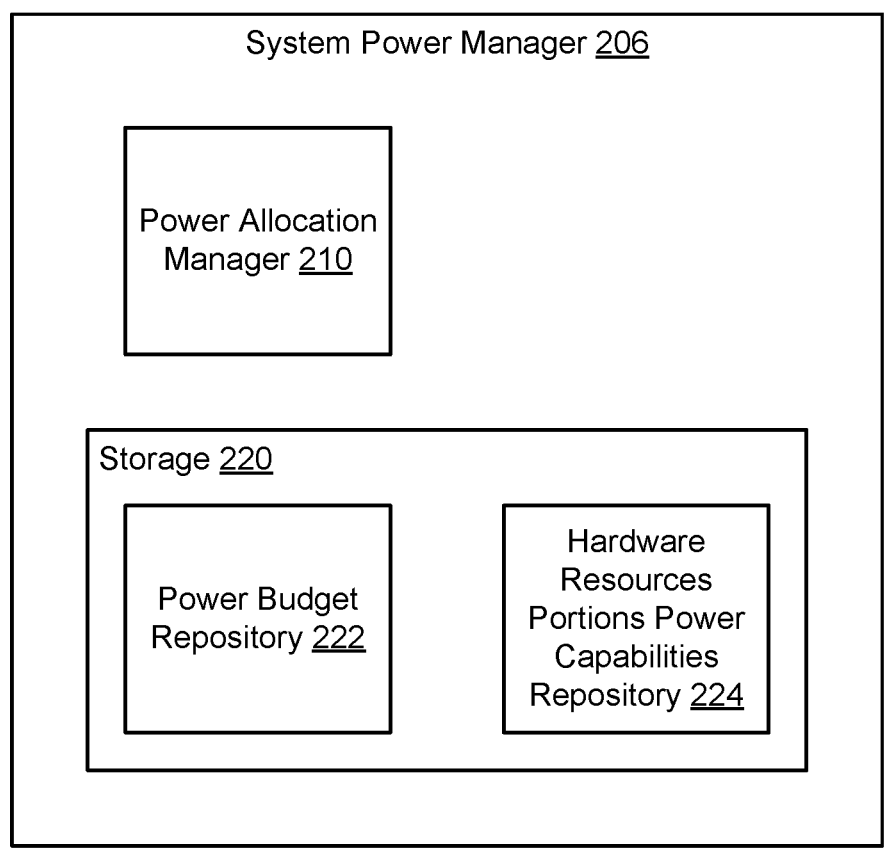
FIG. 2B shows a block diagram illustrating a system power manager in accordance with an embodiment.
Figure 2C:
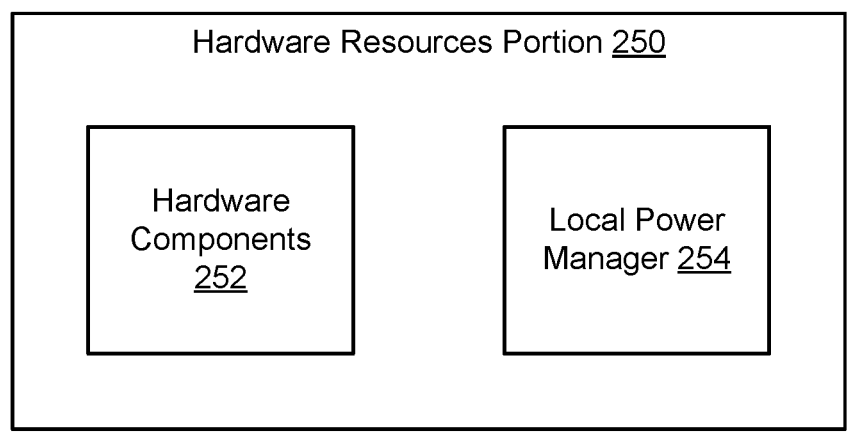
FIG. 2C shows a block diagram illustrating a hardware resources portion in accordance with an embodiment.

Enclosure 110 may include any number of sub-enclosures such as, for example, server chassis sleds, internal blocks, and/or other structures in which various hardware resources portions 102A-102N are positioned. In an embodiment, hardware resources portions 102A-102N positioned in a sub-enclosure operates as an independent computing device. Enclosure 110 may include any number of sub-enclosures that each include computing devices that operate independently and/or cooperatively to provide the computer implemented services. Additionally, each of the sub-enclosures may include a local power manager that cooperates with a system power manager to manage overall system power. Refer to FIGS. 2A-2B for additional details regarding a system power manager. Refer to FIG. 2C for additional details regarding a local power manager.

While the system of FIG. 1 has been illustrated as including a limited number of specific components, a system may include different numbers, types, and/or quantities of components without departing from the embodiments disclosed herein.

Turning to FIG. 2A, a block diagram of the system shown in FIG. 1 in accordance with an embodiment is shown. As discussed above, embodiments disclosed herein may improve the likelihood of a data processing system meeting power consumption goals (e.g., based on power budgets or other types of power goals) while providing desired computer implemented services (e.g., to a user of data processing system 100, to other data processing systems, to other types of devices, etc.).

To provide the computer implemented services, data processing system 100 may include hardware resources portions 102A-102N and power supplies 104. The power supplies 104 may be capable of supplying power to hardware resources 102 so that the hardware resources 102 may provide the computer implemented services through their operation. However, power supplies 104 may include a limited capacity for supplying power which may be insufficient to meet all power allocation requests. For example, hardware resources portions 102A-102N may include capabilities that when fully utilized consume more power than power supplies 104 are able to provide (e.g., based on a nominal power rating of power supplies 104).

To manage the power consumed by hardware resources portions 102A-102N and/or provided by power supplies 104, data processing system 100 may include system power manager 206 and buses 208. Each of these components is discussed below.

System power manager 206 may provide power management services. The power management services may include (i) maintaining a power budget for data processing system 100 (e.g., which may specify a maximum quantity of allocable power), (ii) servicing power allocation requests from hardware resources portions 102A-102N by allocating allocable power while sufficient allocable power from the power budget is available, (iii) obtaining information regarding various types of power allocation modifications that may be made to the existing power allocations, (iv) when insufficient allocable power is available to service power allocation requests, attempting to modify existing power allocations to free additional allocable power, (v) servicing the power allocation requests using the free additional allocable power, and (vi) modifying existing power allocations (e.g., by increasing them) when additional allocable power becomes available (e.g., due to power allocation reductions to various hardware resources portions). When providing its functionality, system power manager 206 may cooperate with local power managers associated with respective hardware resources portions 102A-102N. For example, system power manager 206 may send information regarding power allocations to the local power managers and the local power manager may directly manager the operation of hardware components of a corresponding hardware resources portion to place the hardware components of the hardware resources portion into compliance with the power allocations.

In an embodiment, system power manager 206 is implemented with a computing device such as a host or server, a personal computer (e.g., desktops, laptops, and tablets), a "thin" client, a personal digital assistant (PDA), a Web enabled appliance, an embedded computing device, a mobile phone (e.g., Smartphone), and/or any other type of data processing device or system. In an embodiment, system power manager 206 is implemented using a chassis controller. A chassis controller may be a computing device positioned with a chassis (e.g., that hosts data processing system 100), that is operably connected to data processing system 100 (e.g., via a bus or interconnect), and that may operate independently from data processing system 100. For example, the chassis controller may be implemented as an out of band management controller or other type of computing device. For additional details regarding computing devices, refer to FIG. 5. For additional details regarding system power manager 206, refer to FIG. 2B.

In an embodiment, power supplies 104 provide power to hardware resources portions 102A-102N and/or other components. In an embodiment, power supplies 104 are rated to provide less power than can be consumed by hardware resources portions 102A-102N under all operating conditions. The power budget for data processing system 100 may be set based on the power supplying capacity of power supplies 104. Power supplies 104 may include any number and type of power supplies.

In an embodiment, power supplies 104 are implemented using integrated power supplies. The integrated power supplies may be hosted by a chassis in which data processing system 100 is positioned. Power supplies 104 may supply various types of conditioned power (e.g., 12 volts direct current (DC), 3.3 volts DC, etc.) with fixed voltages and variable currents. When a quantity of power supplied by power supplies 104 exceeds the rated threshold, then power supplies 104 may begin to supply deconditioned power that does not conform to that which hardware resources portions 102A-102N are adapted to use. For example, the voltage levels of the supplied power may begin to droop or other changes may occur. These changes may impair (partially or completely) the operation of hardware resources portions 102A-102N.

To provide its functionality, power supplies 104 may include any number and type of components (e.g., transformers, rectifiers, etc.) to process power from various sources, one or more sensors to measure input current, input voltage, output current, output voltage, input power, output power, etc., and/or a computing device such as a host or server, a personal computer (e.g., desktops, laptops, and tablets), a "thin" client, a personal digital assistant (PDA), a Web enabled appliance, a controller, a system on a chip, an embedded computing device, an out of band management controller, a mobile phone (e.g., Smartphone), and/or any other type of data processing device or system. For additional details regarding computing devices, refer to FIG. 5.

In an embodiment, power supplies 104 do not include functionality to limit output power. For example, power supplies 104 may be adapted to output conditioned power up to a predetermined level after which the operation of the power supplies 104 may deteriorate or otherwise diverge from nominal operation.

To manage the quantity of power supplied by power supplies 104, the system power manager 206 (e.g., in cooperate with local power managers) may (i) identify a portion of power consumption mechanisms of hardware resources portions 102A-102N usable to cause hardware resources 102 to consume power as specified by the power budget (e.g., in accordance with corresponding allocations), and/or (ii) invoke the identified portion of the power consumption mechanisms to attempt to place hardware resources portions 102A-102N in compliance with the power allocations of the power budget. In this manner, the quantity of power supplied by power supplies 104 may be managed to meet power consumption goals (e.g., to improve the likelihood that power supplies 104 are able to provide conditioned power rather than deconditioned power).

The power consumption mechanisms may include, for example, modulation of clock speed or processors, memory modules, storage devices, communications devices, and/or other types of devices (collectively, "hardware devices"); suspending and/or resuming operation of various portions of the hardware devices; and/or other functions that may be usable at any level of granularity to reduce the performance (e.g., rates of contribution of computing resources) of hardware resources 102 for power draw management purposes.

In an embodiment, the power consumption mechanisms include methods of performing startups of hardware resources portions 102A-102N. For example, to reduce power consumption to meet a power allocation, system power manager 206 may instruct (and/or confirm) a hardware resources portion to modify a startup being performed. The startup may initially be performed as a high performance startup (e.g., completed quickly) but may be modified to a power conserving startup (e.g., slower) to reduce power consumption of the hardware resources portion.

Buses 208 may include one or more physical devices for operably connecting components of data processing system 100. Buses 208 may include, for example, a power bus over which power supplies 104 provide conditioned power to hardware resources portions 102A-102N and/or other components. Buses 208 may include any number of data buses (analog and/or digital) over which data is sent between the components of data processing system 100. For example, the power allocation requests and/or instructions regarding power allocations may be transmitted via one or more of buses 208. The data buses may facilitate, for example, direct communications, side band communications (e.g., between system power manager 206 and hardware resources portions 102A-102N), interrupt communications, and/or other types of communications.

While the system of FIG. 2A has been illustrated as including a limited number of specific components, a system may include different numbers, types, and/or quantities of components without departing from the embodiments disclosed herein.

Turning to FIG. 2B, a diagram of system power manager 206 in accordance with an embodiment is shown. As discussed above, system power manager 206 may provide power management services. To provide its functionality, system power manager 206 may include power allocation manager 210 and storage 220. Each of these components is discussed below.

Power allocation manager 210 may provide the power management services. To do so, power allocation manager 210 may: (i) obtain a power budget (e.g., stored in power budget repository 222), (ii) make power allocations to service power allocation requests and store information regarding the power allocations (e.g., which may include potential modifications to the allocations) in hardware resources portions power capabilities repository 224 and/or power budget repository 222, (iii) reconfigure existing power allocations to free allocable power when needed to service power allocation requests, and/or (v) allocate additional power to existing power allocations when allocable power is available and the changes to the existing power allocations may improve the operation of a data processing system (e.g., improve the speed at which a hardware resources component reaches a predetermined operating state). When providing the aforementioned services, power allocation manager 210 may cooperate with or otherwise invoke the functionality of local power managers of various hardware resources portions. To do so, power allocation manager 210 and the local power managers may implement any control and/or communication scheme (e.g., message passing, subscription models, master-slave operation, etc.).

In an embodiment, power allocation manager 210 is implemented using a hardware device including circuitry. The hardware device may be, for example, a digital signal processor, a field programmable gate array, or an application specific integrated circuit. The circuitry may be adapted to cause the hardware device to perform the functionality of power allocation manager 210. Power allocation manager 210 may be implemented using other types of hardware devices without departing embodiment disclosed herein.

In one embodiment, power allocation manager 210 is implemented using a processor adapted to execute computing code stored on a persistent storage that when executed by the processor performs the functionality of power allocation manager 210 discussed throughout this application. The processor may be a hardware processor including circuitry such as, for example, a central processing unit, a processing core, or a microcontroller. The processor may be other types of hardware devices for processing information without departing embodiment disclosed herein.

When providing its functionality, power allocation manager 210 may perform all, or a portion, of the methods, actions, and/or operations shown in and described with respect to FIGS. 3A-4I.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 220 may store data structures including power budget repository 222 and hardware resources portions power capabilities repository 224. Each of these data structures is discussed below.

Power budget repository 222 may be implemented with one or more data structures that include any type and quantity of information indicating (i) maximum quantities of power that may be consumed by various portions (e.g., hardware resources portions) of a data processing system and (ii) existing power allocations. Power budget repository 222 may be maintained by power allocation manager 210 and used to identify free allocable power and various existing power allocations (e.g., which may also reference portions of repository 224).

Hardware resources portions power capabilities repository may be implemented with one or more data structures that include any type and quantity of information indicating (i) existing power allocations (e.g., to hardware resources portions), (ii) whether the allocations can be modified, and (iii) corresponding power allocation information for any such modifications. The aforementioned information may be provided by local power managers when a power allocation is made by power allocation manager 210. Using the information included in this repository, power allocation manager 210 may identify changes to power allocations that may be implemented to increase a quantity of free allocable power. Likewise, power allocation manager 210 may identify changes to power allocations that may be implemented to improve the operation of various hardware resources portions through increased power allocation.

For example, repository 224 may be implemented as a list. Each entry of the list may be associated with a corresponding hardware resource component to which power has been allocated. Each entry may also specify various modifications that may be made and corresponding power allocations. In an embodiment, the modifications specify changes to startup operation of a hardware resources portion and corresponding power consumption rates. An example entry may, for example, specify a first modification to reduce a rate of the startup and a corresponding reduction in power consumption during the startup and a second modification to increase a rate of the startup and a corresponding increase in power consumption during the startup. Thus, power allocation manager 210 may dynamically modify that manner in which various hardware resources portions perform startups to manage power consumption of the data processing system to comply with a power budget.

While various data structures have been illustrated and described in FIG. 2B with specific structures, any of the data structures may be implemented with different structures (e.g., lists, tables, linked lists, databases, etc.), stored in different locations, combined with other information or divided into any number of sub-structures, and/or spanned across any number of devices without departing from embodiments disclosed herein.

While illustrated in FIG. 2B with a limited number of specific components, a system power manager may include additional, fewer, and/or different components without departing from embodiments disclosed herein.

Turning to FIG. 2C, a block diagram of example hardware resources portion 250 in accordance with an embodiment is shown. Hardware resources portion 250 may be similar to any of hardware resources portions 102A-102N.

Hardware resources portion 250 may provide any type and quantity of computer implemented services. The provided computer implemented services may change over time.

To provide the computer implemented services, hardware resources portion 250 may include hardware components 252 which may include any type and quantity of hardware devices. The hardware devices, as discussed above, may consume power when operating. To manage power consumption by hardware components 252, hardware resources portion 250 may include local power manager 254.

Local power manager 254 may manage power consumption by hardware components 252 to match power allocations set by a system power manager. To do so, local power manager 254 may modify various characteristics regard the operation of hardware components 252, may modify startup processes being performed by hardware components 252, and/or may perform other operations.

When providing its functionality, local power manager 254 may cooperate with system power manager by (i) limiting power consumption by hardware components 252 to that allocated by a system power manager, and (ii) providing the system power manager with various modifications to hardware resources portion 250 for power management. For example, local power manager 254 may notify the system power management of various modifications that may be made to hardware resources portion 250 which may modify power consumption by hardware components 252 and the impact of such modifications on the functionality of hardware resources portion 250.

When providing its functionality, local power manager 254 may perform all, or a portion, of the methods, operations, and/or actions shown in and described with respect to FIGS. 3A-4I.

In an embodiment, local power manager 254 is implemented using a hardware device including circuitry. The hardware device may be, for example, a digital signal processor, a field programmable gate array, or an application specific integrated circuit. The circuitry may be adapted to cause the hardware device to perform the functionality of local power manager 254. Local power manager 254 may be implemented using other types of hardware devices without departing embodiment disclosed herein.

In one embodiment, local power manager 254 is implemented using a processor adapted to execute computing code stored on a persistent storage that when executed by the processor performs the functionality of local power manager 254 discussed throughout this application. The processor may be a hardware processor including circuitry such as, for example, a central processing unit, a processing core, or a microcontroller. The processor may be other types of hardware devices for processing information without departing embodiment disclosed herein.

While illustrated in FIG. 1 with a limited number of specific components, a hardware resources portion may include additional, fewer, and/or different components without departing from embodiments disclosed herein.

Figure 3A:
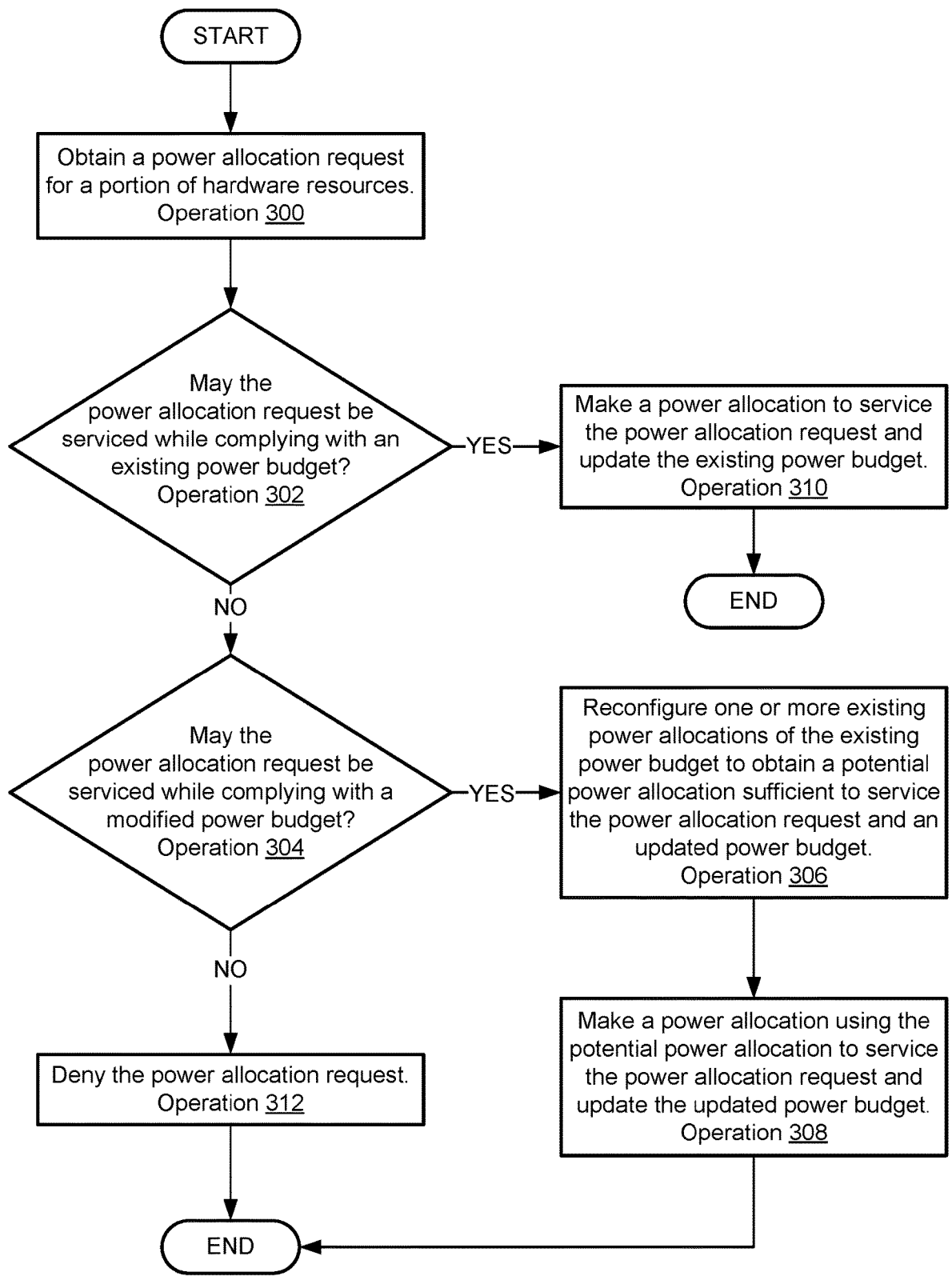
FIG. 3A shows a flow diagram illustrating a method of servicing power allocation requests in accordance with an embodiment.
Figure 3B:
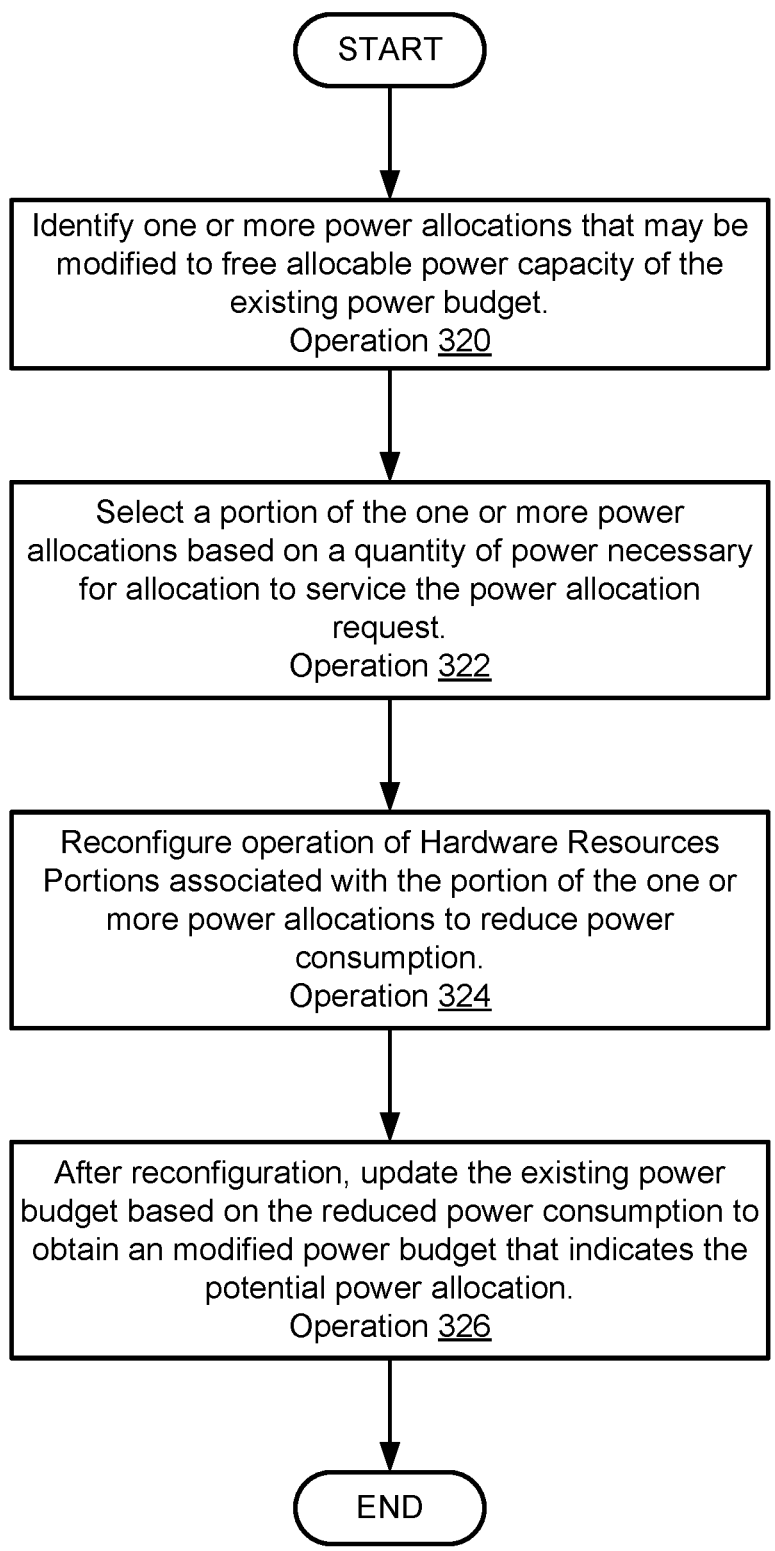
FIG. 3B shows a flow diagram illustrating a method of reconfiguring existing power allocations in accordance with an embodiment.

As discussed above, the components of FIG. 1 may perform various methods to manage power consumption in a data processing system. FIGS. 3A-3B illustrate examples of methods that may be performed by the components of FIG. 1. In the diagrams discussed below and shown in FIGS. 3A-3B, any of the operations may be repeated, performed in different orders, and/or performed in parallel with or a partially overlapping in time manner with other operations.

Turning to FIG. 3A, a flow diagram illustrating a method of managing power in a data processing system in accordance with an embodiment is shown. The method may be performed, for example, when operation of a hardware resources portion is started. Starting operation of the hardware resources portion may cause a startup process to be performed. During the startup, certain operations may be performed which may consume power. To manage the power consumption, the method shown in FIG. 3A may be performed.

At operation 300, a power allocation request for a portion of hardware resources is obtained. The power allocation request may be obtained from a local power manager associated with the hardware resources portion (e.g., via message passing or other communication scheme). The power allocation request may specify a quantity of power that is being requested for allocation to the hardware resources portion. Until so allocated, the local power manager may limit power consumption by hardware devices of the hardware resources portion thereby allowing a data processing system to comply with a power budget.

At operation 302, a determination is made regarding whether the power allocation request may be serviced while complying with an existing power budget. To service the power allocation request, a quantity of power (e.g., indicated by the request) may need to be allocated to the hardware resources portion. The determination may be made by comparing the quantity of power to a quantity of free allocable power (e.g., which may be read from or derived based on the information included in repository 222). If the quantity of power is larger than the quantity of free allocable power, then it may be determined that the power allocation request cannot be serviced while complying with the existing power budget.

If it is determined that the power allocation request can be serviced while complying with the existing power budget, then the method may proceed to operation 310 following operation 302. Otherwise, the method may proceed to operation 304 following operation 302. Proceeding to operation 304 following operation 302 may indicate that beginning operation of the hardware resources portion may cause the data processing system to consume more power than is allowable (e.g., as specified by the power budget).

At operation 304, a determination is made regarding whether the power allocation request may be serviced while complying with a modified power budget. The modified power budget may be a hypothetical power budget which includes at least one decrease on power allocation when compared to the existing power budget. The decrease in power allocation may increase the free allocable power.

The determination may be made, for example, by analyzing the modifications that may be made to the existing power budget to ascertain whether sufficient free allocable power may be obtained (e.g., via modifications to power allocations) to service the power allocation request. The determination may be made, for example, by summing the total quantity of allocable power that may be obtained by implementing all, or a portion, of modifications specified by a hardware resources portions power capabilities repository 224.

If it is determined that the power allocation request may be serviced while complying with the modified power budget, then the method may proceed to operation 306 following operation 304. Otherwise, the method may proceed to operation 312 following operation 304.

At operation 306, one or more existing power allocations of the existing power budget are reconfigured. The existing power allocations may be reconfigured to obtain a potential power allocation sufficient to service the power allocation request and an updated power budget (e.g., with additional free allocable power).

In an embodiment, the existing power allocations are reconfigured by (i) selecting some of the modifications to the existing power allocations, and (ii) implementing the modifications. The modifications may be implemented by providing instructions to local power managers associated with hardware resources portions associated with the existing power allocations.

For example, a modification may be identified using repository 224 and the modification may be sent to a local power manager corresponding to the modification. In response, the local power manager may modify the operation of the hardware resources portion to comply with the change in power allocation. For example, the power manager may modify a startup processing being performed to consume power at a reduced rate (e.g., which may increase the duration of the startup process).

In an embodiment, the reconfiguration is performed via the method illustrated in FIG. 3B. The reconfiguration may be performed via other methods without departing from embodiments disclosed herein.

In an embodiment, the reconfiguration is performed by placing all of the hardware resources portions of a data processing system in a reduced power consumption state during startup. For example, rather than attempting to granularly identify potential modifications, all of the hardware resources portions may be placed in a reduced power consumption state thereby free a sufficient quantity of allocable power of the updated power budget to service the power allocation request without violating the updated power budget.

In an embodiment, the reconfiguration may also include performing one or more actions to increase the likelihood that the power allocation reconfigurations are implemented. For example, a period of time may be waited following sending of instructions to the local power managers to implement the power allocation reconfigurations. The period of time may be based on, for example, responsiveness limitations during startup processes. In another example, a verification such as waiting until an acknowledgement from a local power manager is received (e.g., before making the power allocation in operation 308) may be performed. The local power manager may provide such acknowledgements after the local power manager has successfully enforced power allocation reconfigurations on corresponding hardware resources portions.

At operation 308, a power allocation is made using the potential power allocation to service the power allocation request and update the updated power budget. The potential power allocation may be the additional free allocable power obtained by operation 306. The power allocation may be made by allocating all, or a portion, of the additional free allocable power to the hardware resources portion. The allocation may be made, for example, by providing instructions regarding the power allocation to a local power manager of the hardware resources portion. In turn, the local power manager may enforce (e.g., limit power consumption) the power allocation on the hardware devices of the hardware resources portion.

The further updated power budget may reflect the changes in the power allocations of operations 306 and 308. For example, the further updated power budget may indicate that some of the hardware resources portions are operating at a reduced power consumption rate (e.g., from that typically employed, nominally used, etc.).

The method may end following operation 308.

Returning to operation 302, the method may proceed to operation 310 following operation 302 when it is determined that the power allocation request may be serviced with complying with an existing power budget.

In operation 310, a power allocation is made to satisfy the power allocation request and update the existing power budget. In operation 310, sufficient free allocable power is available to be used to service the power allocation without violating the power budget. Consequently, the existing free allocable power may be allocated to service the power allocation request (in contrast to operations 306-308 in which additional free allocable power is obtained to service the power allocation request). Information regarding the power allocation may be stored in a repository 222 to update the existing power budget. Additionally, modifications that may be made to the power allocation may also be stored in a repository 224 such that the system power manager may be able to identify reconfigurations to power allocations that may be made in the future (e.g., to facilitate servicing of additional power allocation requests).

The method may end following operation 310.

Returning to operation 304, the method may proceed to operation 312 following operation 304 when it is determined that the power allocation request may not be serviced while complying with any modified power budget.

At operation 312, the power allocation request is denied. The power allocation request may be denied by sending instructions to the local power manager (e.g., that sent the power allocation request) associated with the hardware resources portion. The instructions may specify that the requested power may not be allocated to the hardware resources portion at this time.

The method may end following operation 312.

Turning to FIG. 3B, a flow diagram illustrating a method of reconfiguring a power budget in accordance with an embodiment is shown.

At operation 320, one or more power allocations are identified. The identified power allocations may be modified to free allocable power capacity of the existing power budget. The identifications may be made using information included in a repository 224 that specifies modifications that may be made to existing power allocations and the impact such modifications may have on the free allocable power.

At operation 322, a portion of the one or more power allocations are selected based on a quantity of power necessary for allocation to service the power allocation request. The portion of the one or more power allocations may be selected by summing additional free allocable power contributed by the modifications associated with the one or more power allocations until the additional free allocable power exceeds the quantity of power necessary for allocation to service the power allocation request. In otherwise, only some of the power allocations that may be modified may be selected in operation 322 such that only the quantity (or at least the quantity with minimal excess) of power necessary to service the power allocation request is freed.

At operation 324, operation of hardware resources portions associated with the portion of the one or more power allocations are reconfigured to reduce power consumption. The operation of the hardware resources may be reconfigured by sending instructions to local power managers associated with the hardware resources portions. The instructions may place the hardware resources portions into low power consumption modes of operation. For example, startup processes being performed by the hardware resources portions may be slowed to reduce power consumption by the hardware resources portions.

At operation 326, the existing power budget is updated based on the reduced power consumption. By doing so, a modified power budget may be obtained that indicates the potential power allocation discussed with respect to operation 306. The power budget may be updated by storing information regarding the changes in power allocated to the hardware resources portions that were reconfigured in operation 324. The updated power budget may indicate that additional free allocable power is available for allocation. This additional free allocable power may be the potential power allocation (or a portion of it if some existing free allocable power was available prior to the reconfiguration in operation 324).

The method may end following operation 326.

Using the methods illustrated in FIGS. 3A-3B, a system in accordance with an embodiment may facilitate power management in data processing systems that include power supplies that are unable to provide desired quantities of power under all operating conditions. By doing so, the operation of various hardware resources portions may be enabled while staying within a power budget for the system. Consequently, the system may be more likely to provide desired computer implemented services (e.g., when compared to systems that do not dynamically reconfigure power allocations resulting in certain hardware resources portions being prevented from operating during various periods of time when power demand is high).

To further clarify embodiments disclosed herein, diagrams illustrating example blocks and operations are shown in FIGS. 4A-4I. These figures illustrate, in part, an example data processing system 400 (which may be similar to data processing system 100). Data processing system 400 may include hardware resources portions 402A-402C, system power manager 406, and power supplies 404. These components may be similar to similarly names components shown in FIGS. 1-2C.

Figure 4A:
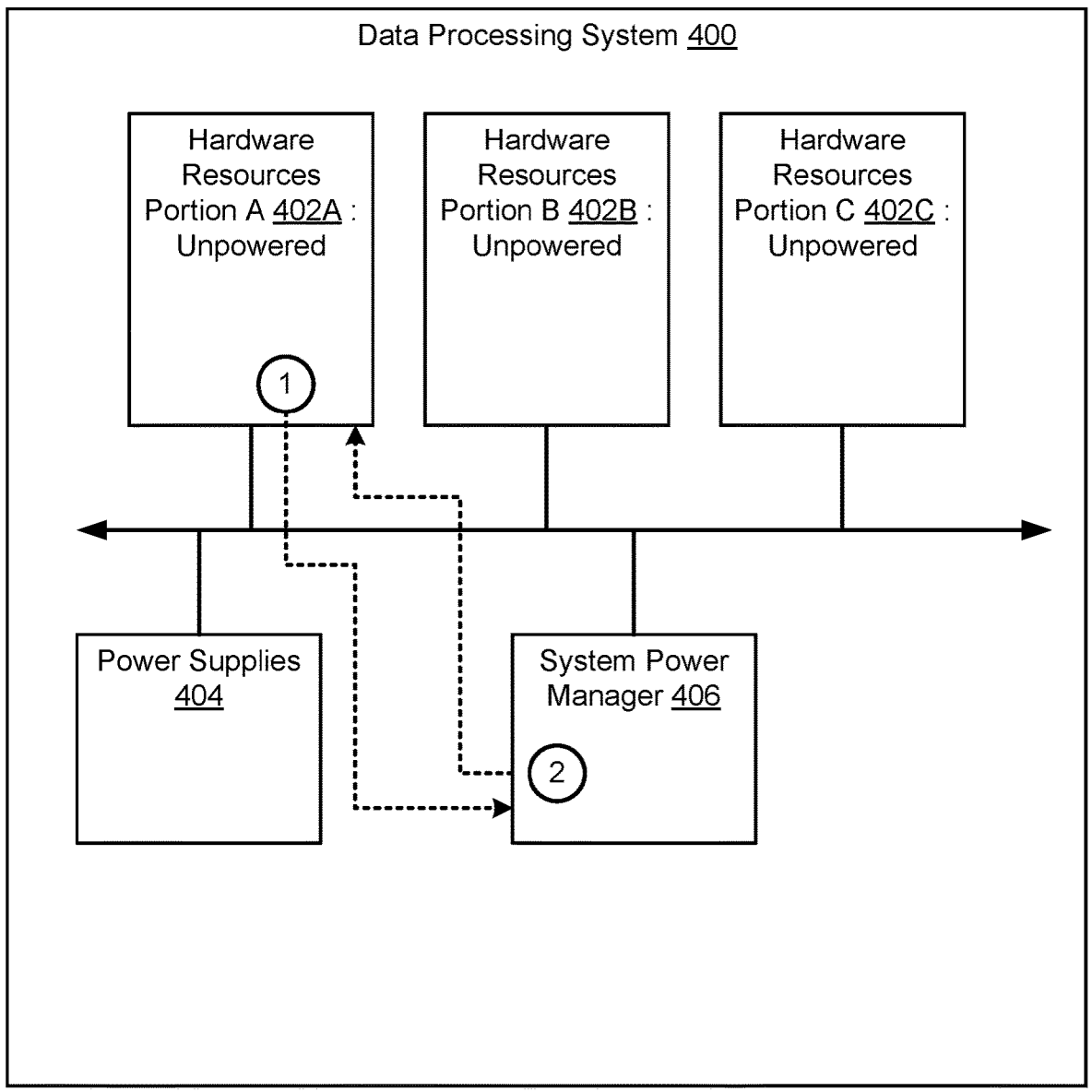
FIGS. 4A-4I show diagrams illustrating operation of an example system at different points in time in accordance with an embodiment.
Figure 4B:
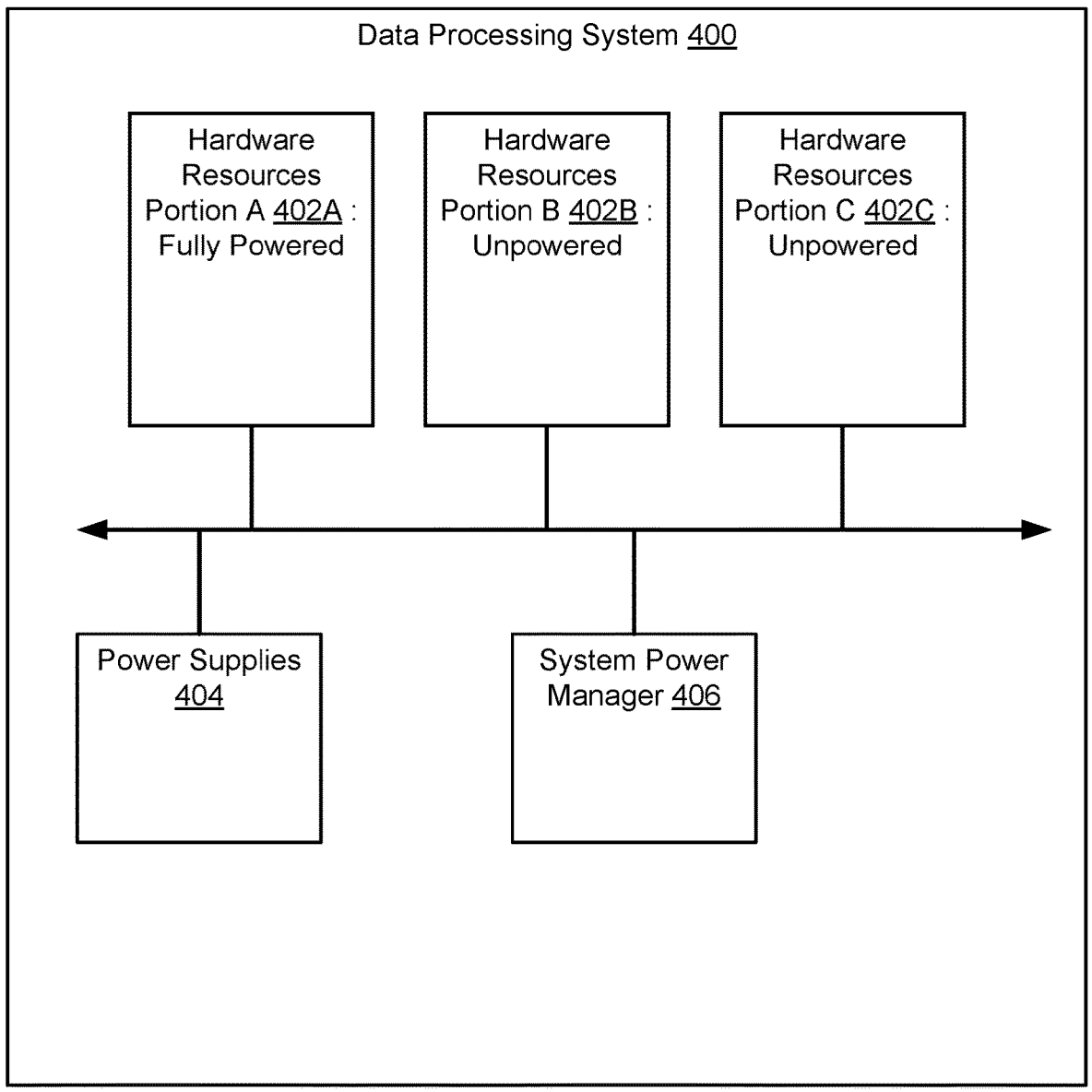

Turning to FIG. 4A, consider a scenario in which data processing system 400 is powered on from a power off state. When powered on, hardware resources portion A 402A may identify that it needs to perform a startup to provide computer implemented services. However, it may not have a power allocation.

In response to the identification, at block 1, hardware resources portion A 402 sends a request for a power allocation of 400 watts to system power manager 406 with a modified operation at 300 watts.

System power manager 406 identifies the 400 watts of power and compares it to the power budget which specifies a total of 1000 watts as allocable power. Based on the comparison, at block 2, system power manager 406 allocates 400 watts and sends an instruction to the local power manager (not shown) of hardware resources portion A 402A to implement the 400-watt allocation. Consequently, turning to FIG. 4B, the local power manager implements the 400-watt allocation by placing hardware resources portion A 402A in a fully powered state. In contrast, the other hardware resources portions 402B, 402C are in an unpowered state because they have not received power allocations.

Figure 4C:
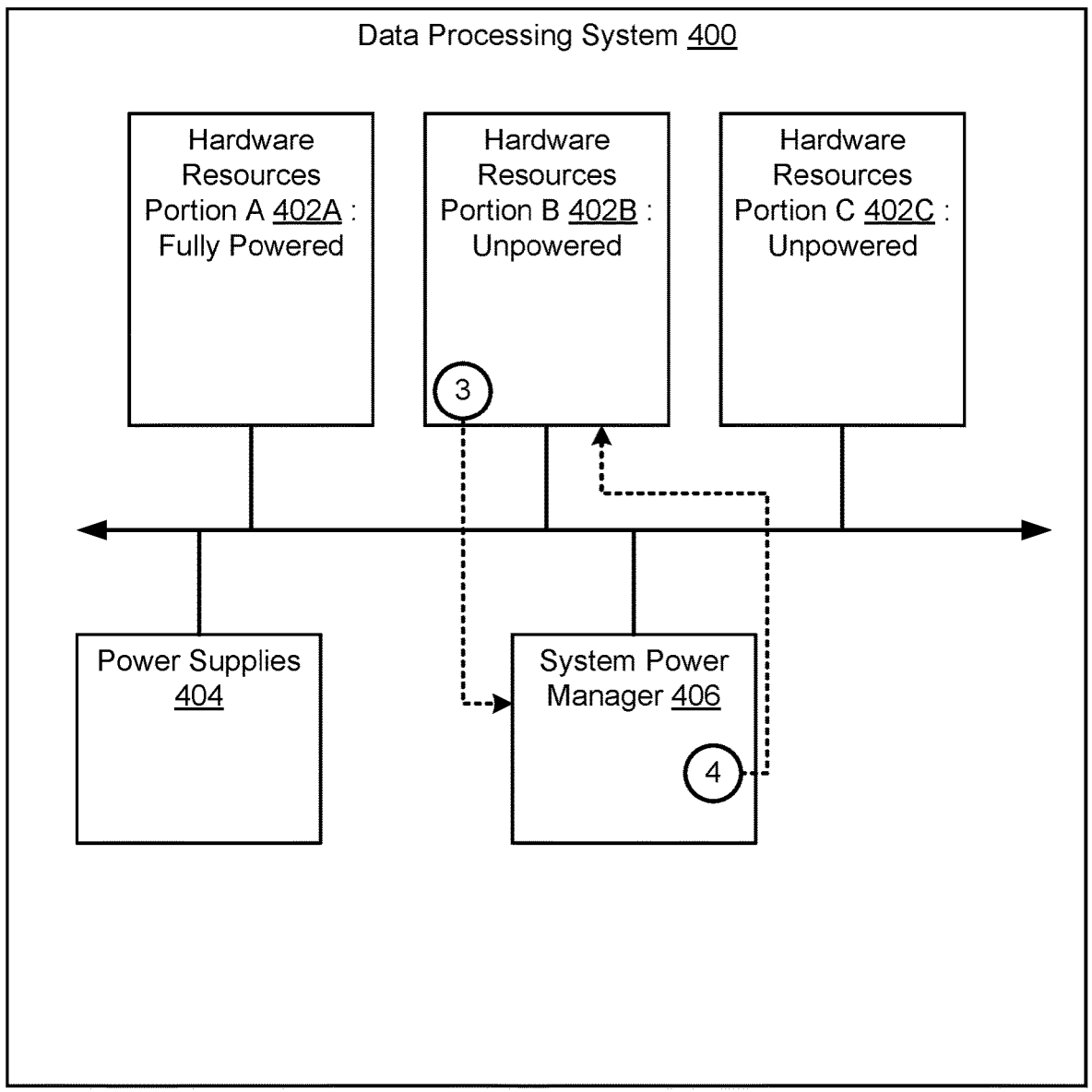
Figure 4D:
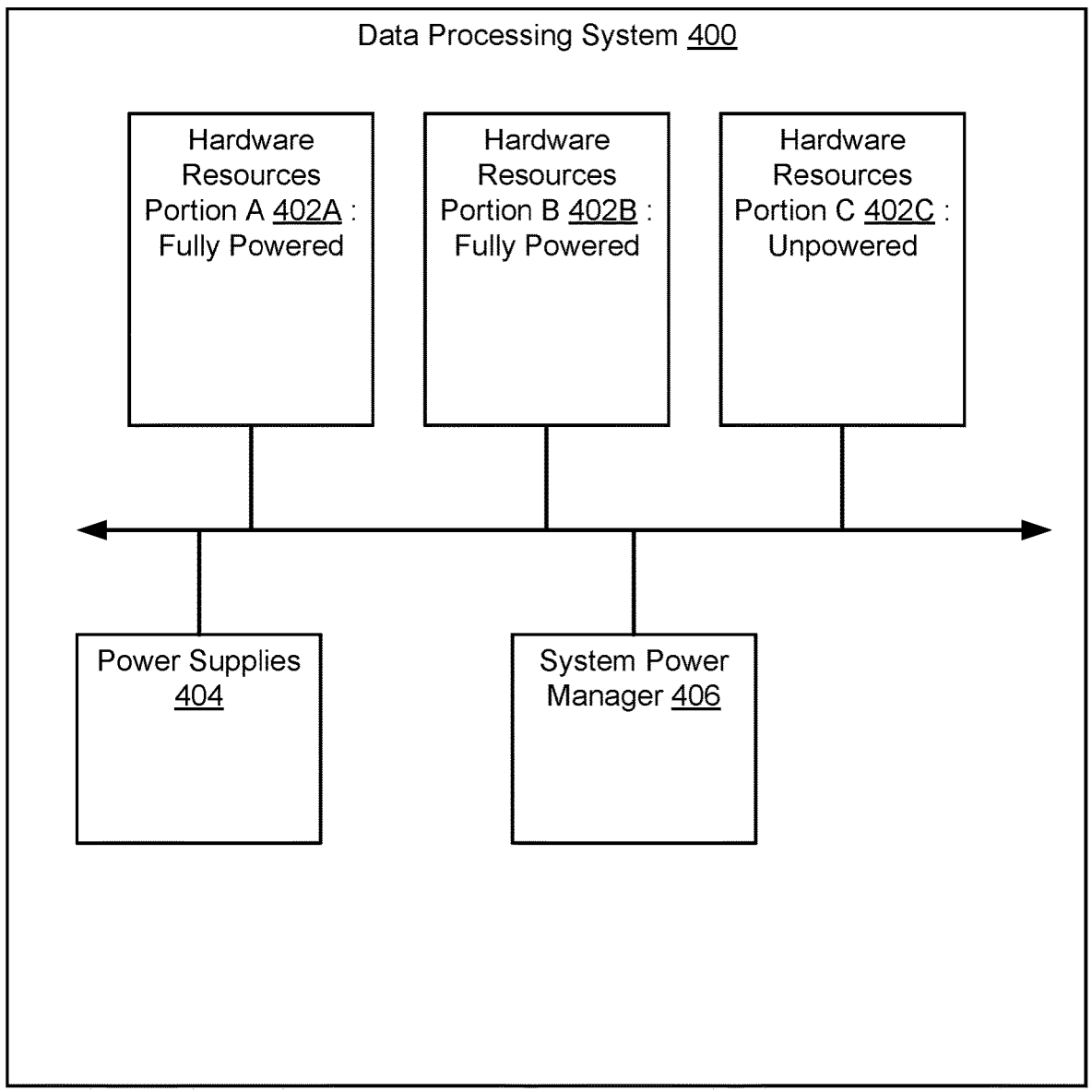
Figure 4E:
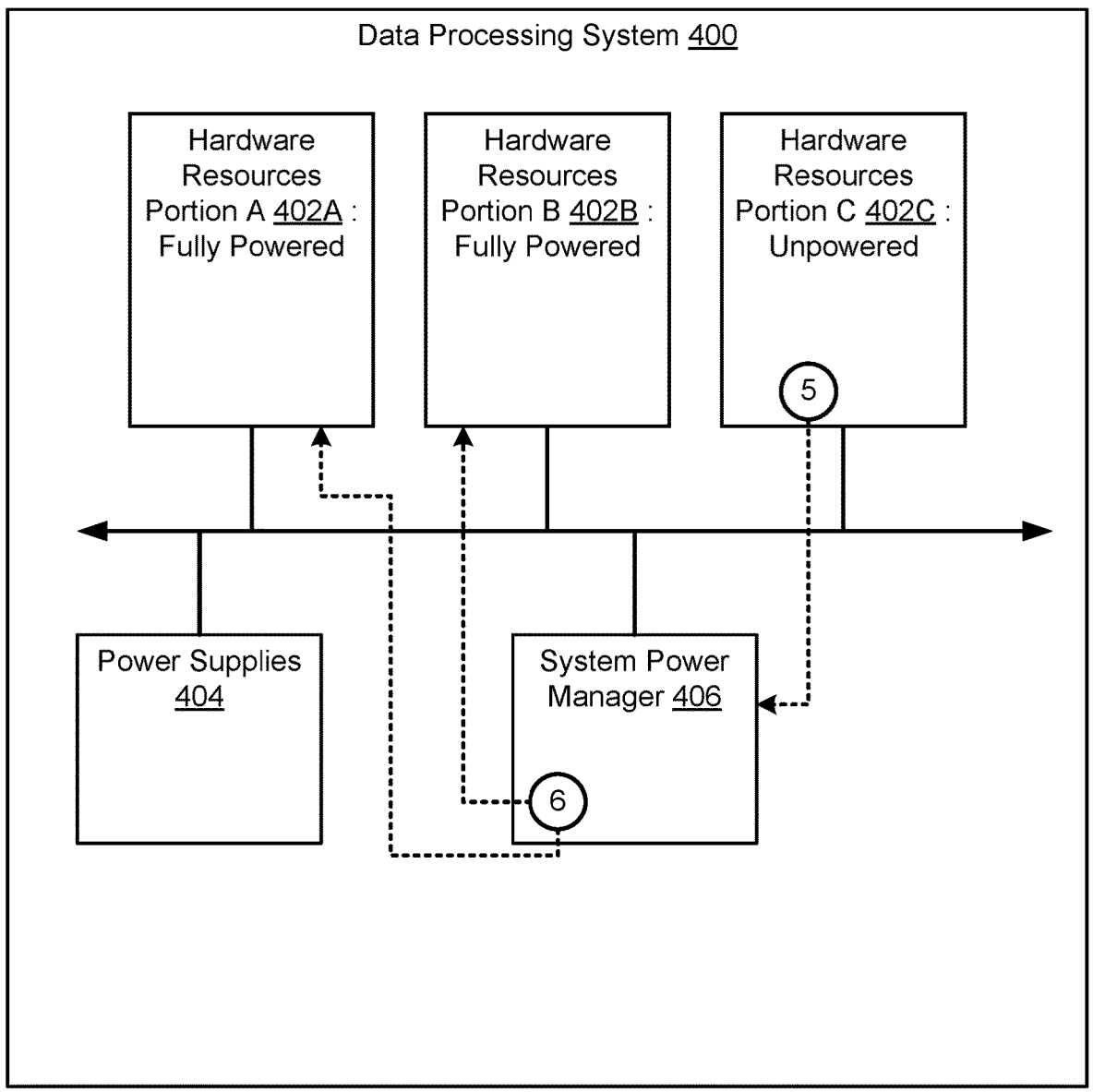

Turning to FIG. 4C, now consider a scenario where at a second point in time, operation of hardware resources portion B 402B becomes desirable for computer implemented services. To place these resources in an operational state, at block 3, the local power manager of hardware resources B sends a request for a power allocation of 400 watts to system power manager 406 with a modified operation at 300 watts.

System power manager 406 identifies the 400 watts of power and compares it to the updated power budget which specifies a total of 600 watts as allocable power (with 400 being allocated to portion A 402A). Based on the comparison, at block 4, system power manager 406 allocates 400 watts and sends an instruction to the local power manager (not shown) of hardware resources portion B 402B to implement the 400-watt allocation. Consequently, turning to FIG. 4D, the local power manager implements the 400-watt allocation by placing hardware resources portion B 402B in a fully powered state.

Turning to FIG. 4C, now consider another scenario where at a third point in time, operation of hardware resources portion C 402C becomes desirable for computer implemented services. To place these resources in an operational state, at block 5, the local power manager of hardware resources portion C 402C sends a request for a power allocation of 400 watts to system power manager 406 with a modified operation at 300 watts.

However, at block 6, system power manager 406 identifies that the power budget only includes 200 watts of free allocable power. Based on the identification, system power manager 406 identifies that the operation of hardware resources portion A 402A and hardware resources portion B 402B may be modified to only consume 300 watts of power, each, which would result in 400 watts of free allocable power being available in the power budget. Based on the determination, system power manager 406 reconfigures the power allocations (e.g., to the 300-watt consumption levels) and sends instructions to the local power managers of hardware resources portion A 402A and hardware resources portion B 402B to implement the reconfigured power allocations.

Figure 4F:
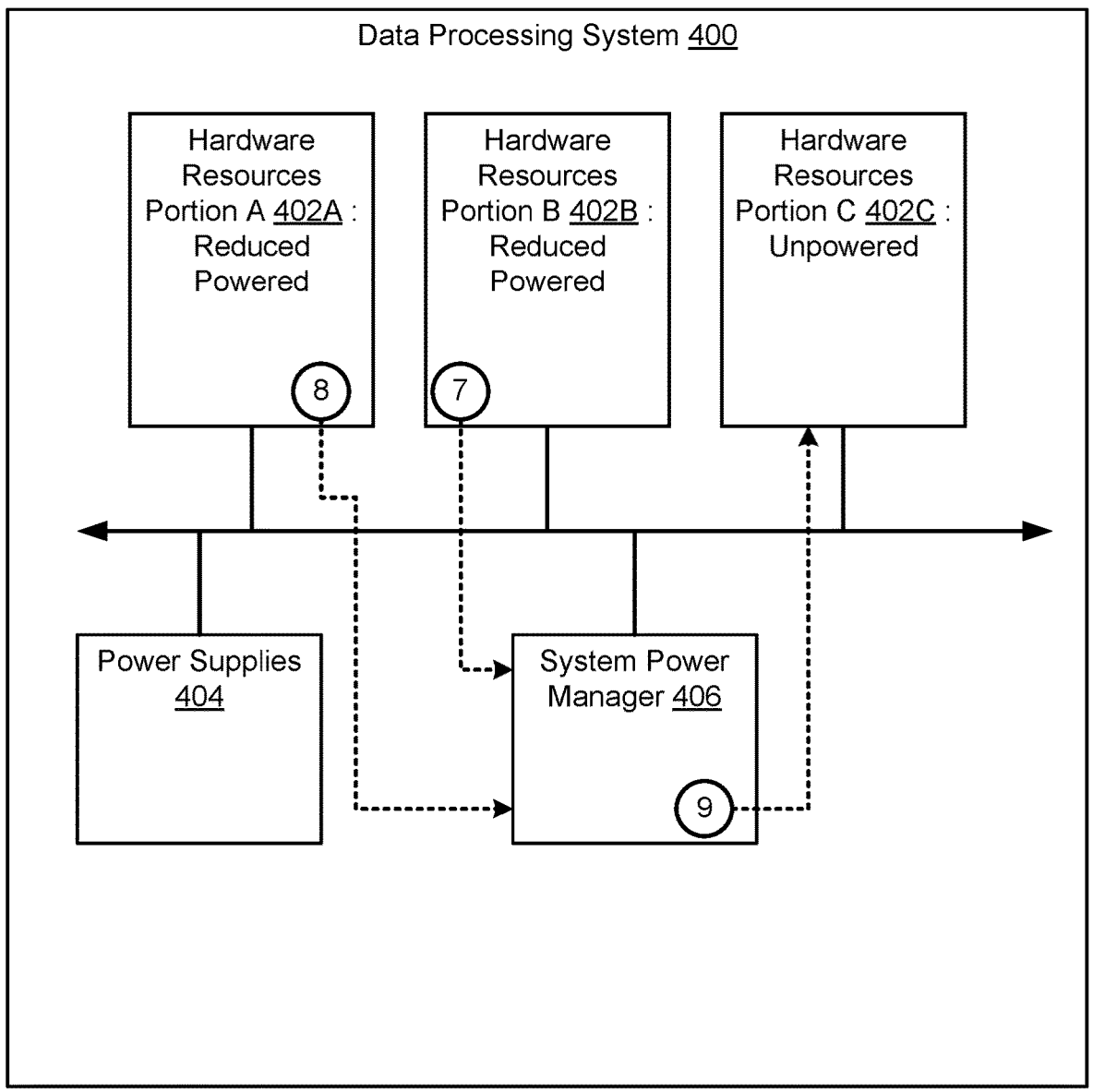

Turning to FIG. 4F, based on the instructions, the local power manager place hardware resources portion A 402A and hardware resources portion B 402B into reduced powered states thereby reducing power consumption to 300 watts each. Once placed in the reduced powered states, at blocks 7 and 8, the local power managers notify system power manager 406 that the reconfigured power allocations are being complied with.

In response to receiving the acknowledgements, at block 9, system power manager 406 identifies that 400 watts are now available for allocation, makes a 300-watt allocation to hardware resources portion C 402C, and sends corresponding instructions to the local power manager associated with hardware resources portion C 402C.

Figure 4G:
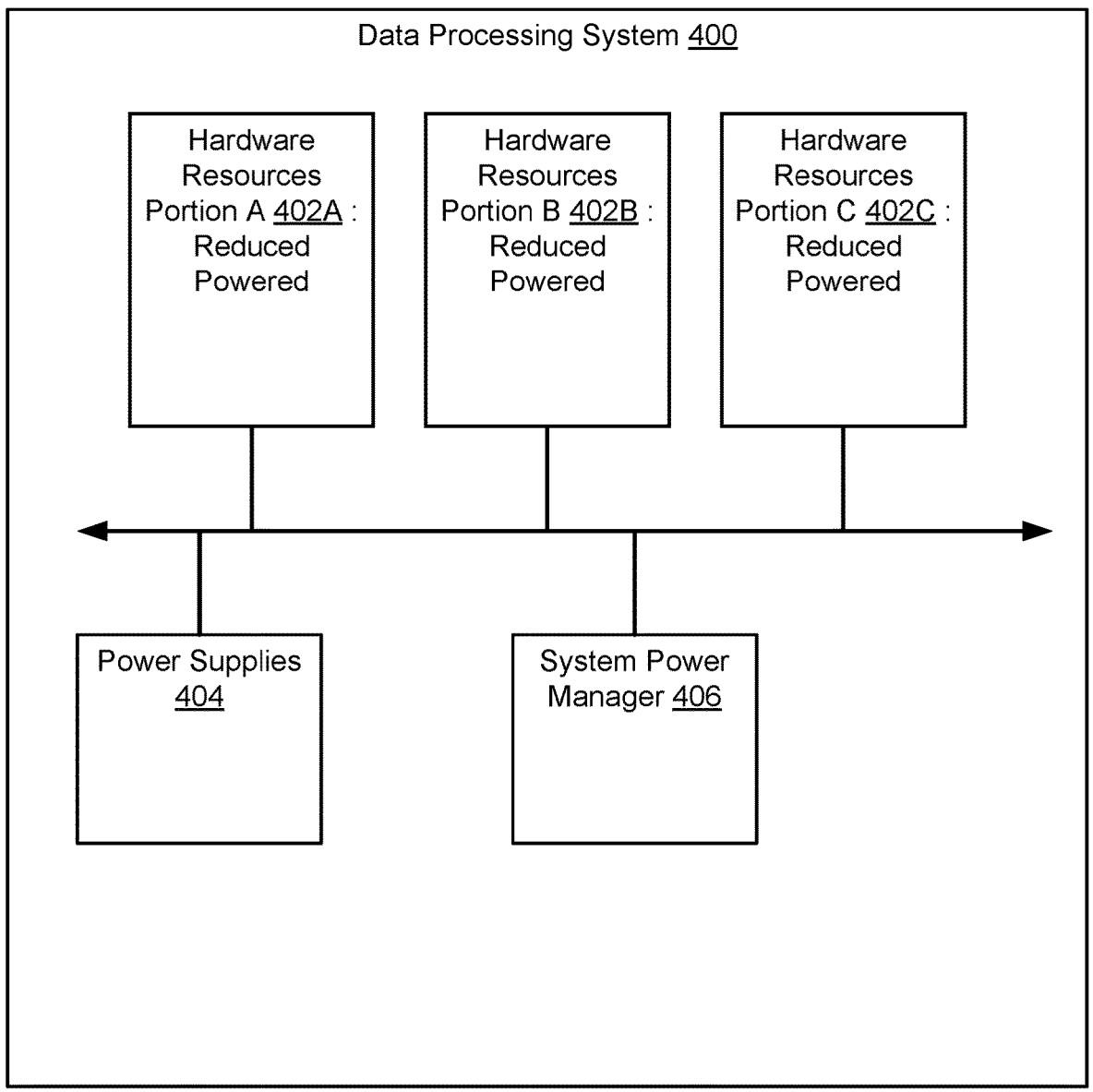

Consequently, turning to FIG. 4G, hardware resources portion C 402C is also placed in a reduced powered state, which allows for these resources to begin to provide the desired services albeit at reduced rates/quality levels from that which would be provided when in a fully powered state.

Figure 4H:
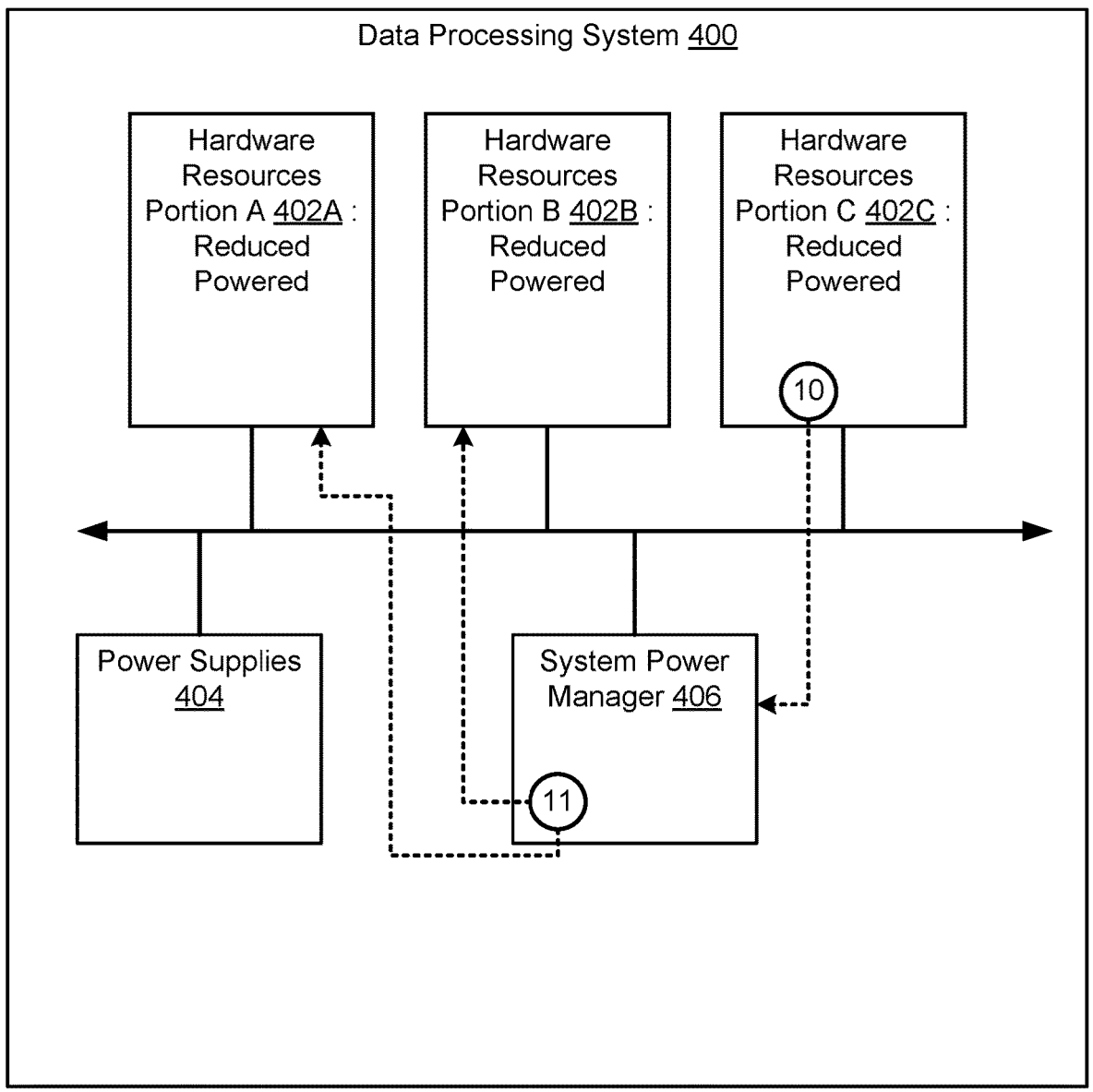

Turning to FIG. 4H, now consider an additional scenario where at a fourth point in time, operation of hardware resources portion C 402C becomes undesirable for computer implemented services. Consequently, at block 10, the local power manager of hardware resources portion C 402C sends a request for a power deallocation of 300 watts to system power manager 406. In response to the power deallocation, system power manager 406 reduces the power allocation to hardware resources portion C 402C resulting in 400 watts of power being available for allocation.

At block 11, system power manager 406 identifies that hardware resources portion A 402A and hardware resources portion B 402B could provide improved services with additional power allocation. Consequently, system power manager 406 increases their power allocations to 400 watts and sends corresponding instructions to the local power managers of hardware resources portion A 402A and hardware resources portion B 402B.

Figure 4I:
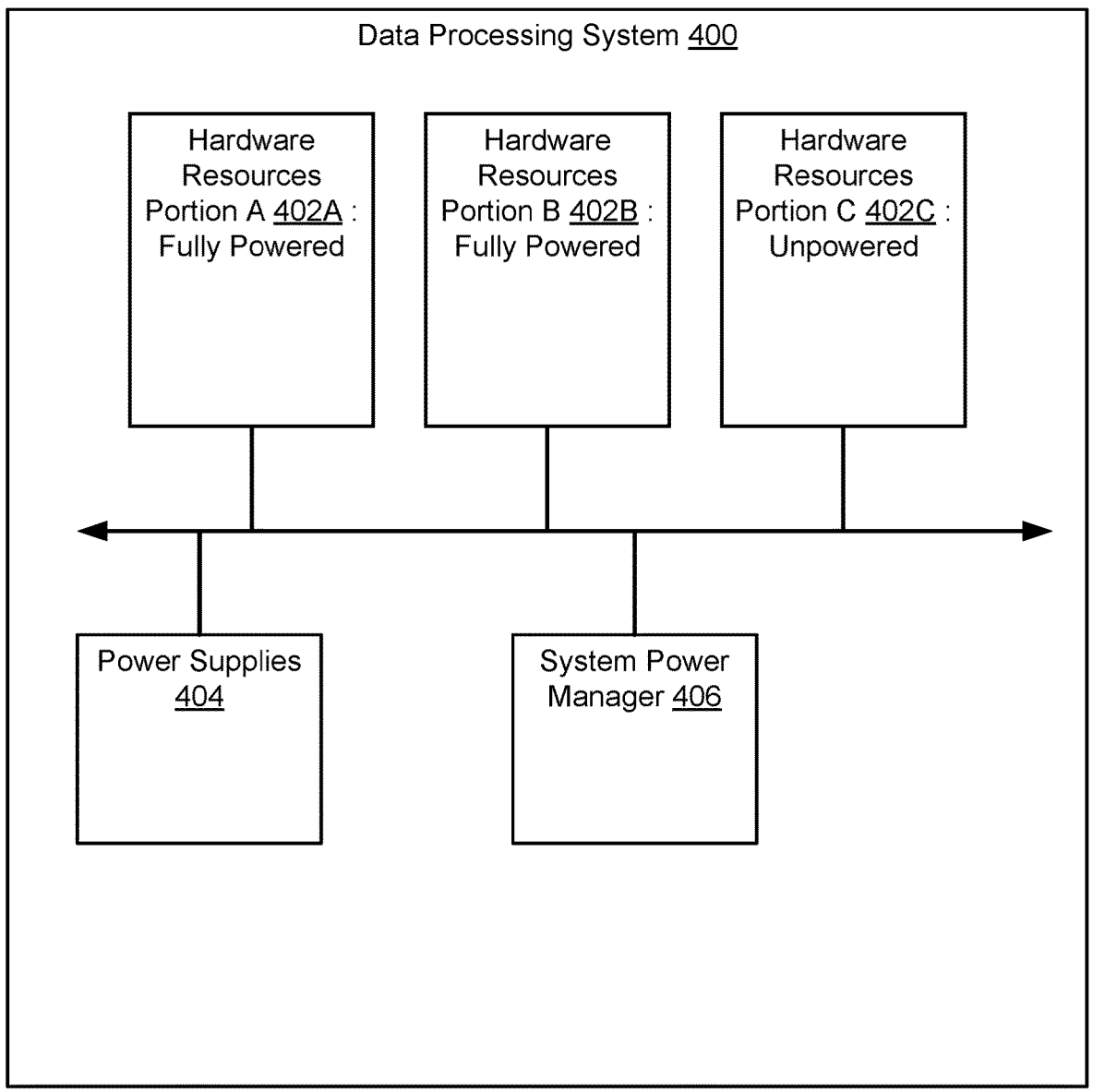

Accordingly, turning to FIG. 4I, hardware resources portion A 402A and hardware resources portion B 402B are returned to fully powered operating states.

In this manner, power consumption by various hardware resources portions may be dynamically reconfigured to improve the performance of computer implemented services while staying within power budgets.

Figure 5:
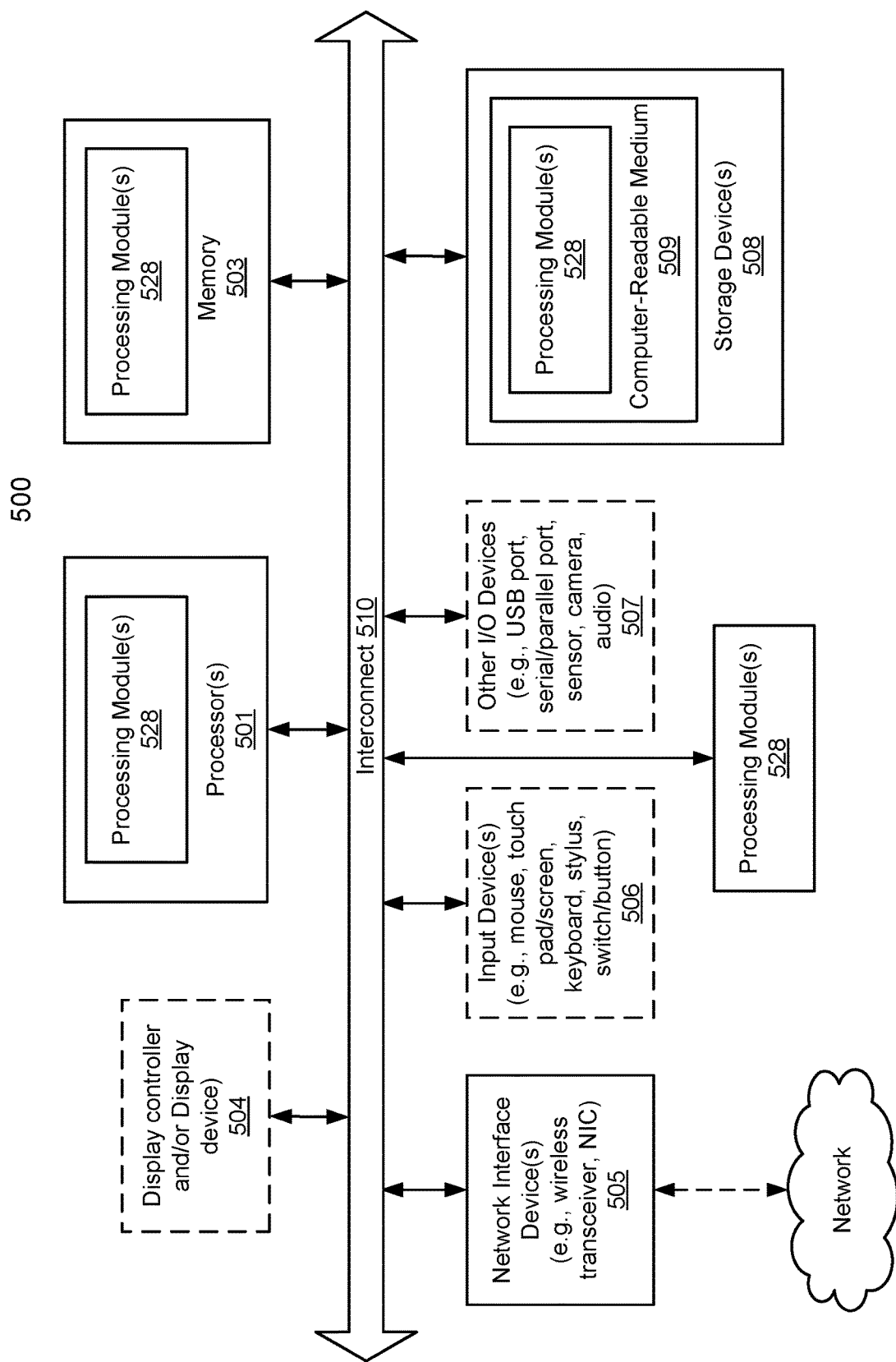
FIG. 5 shows a block diagram illustrating a data processing system in accordance with an embodiment.

Any of the components illustrated in FIGS. 1-4I may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system to provide computer implemented services, the data processing system comprising:
   hardware resources portions; and
   a system power manager adapted to, when a first hardware resources portion of the hardware resources portion is starting a startup operation:
      obtain a power allocation request for the first hardware resources portion, the power allocation request indicating a quantity of power to be allocated to the first hardware resources portion;
      make a determination that the power allocation request cannot be serviced without violating a power budget for the data processing system;
      in response to the determination:
         make a second determination that the power allocation request can be serviced while complying with a modified power budget for the data processing system;
         in response to the second determination:
            reconfigure one or more existing power allocations of the power budget to obtain:
               a potential power allocation sufficient to service the power allocation request without violating the modified power budget, and
               the modified power budget,
            wherein reconfiguring the one or more existing power allocations of the power budget comprises:
               placing all currently operating ones of the hardware resources portions into a low power consumption operating state,
               wherein placing all of the currently operating ones of the hardware resources portion into the low power consumption operating state comprises at least:
                  causing all hardware resource portions among all of the currently operating ones of the hardware resources portions that are still executing the startup operation while the first hardware resources portion is starting the startup operation to switch from executing the startup operation in a first startup operation mode to executing the startup in a second startup operation mode that reduces a speed at which the startup operation is being executed and uses less power consumption than the first startup operation mode,
               wherein the hardware resources portions switch from the first startup operation mode to the second startup operation mode without pausing or stopping the startup operation; and
            make a power allocation for the first hardware resources portion using the potential power allocation to:
               service the power allocation request, and
               obtain a second modified power budget for the data processing system.

2. The data processing system of claim 1, wherein reconfiguring the one or more existing power allocations comprises:
   identifying a portion of power allocations specified by the power budget that may be modified to free power capacity of the power budget;
   selecting a sub-portion of the portion of the power allocations based on a quantity of power to service the power allocation request;
   reconfiguring operation of a portion of the hardware resources portions associated with the sub-portion of the portion of the power allocations to reduce power consumption; and
   updating the power budget based on the reduced power consumption to obtain the modified power budget for the data processing system, the modified power budget indicating the potential power allocation.

3. The data processing system of claim 1, wherein reconfiguring operation of the portion of the hardware resources portions comprises:
   for a hardware resources portion of the portion of hardware resources portions:
      instructing a local power manager of the hardware resources portion to consume a reduced quantity of power; and
      waiting a predetermined quantity of time after the instructing or waiting until an acknowledgement indicating that the local power manager has reconfigured the hardware resources portion to consume the reduced quantity of power.

4. The data processing system of claim 3, wherein the local power manager comprises an out of band manager that is adapted to manage power consumption by the hardware resources portion by modifying operation of hardware components of the hardware resources portion.

5. The data processing system of claim 1, wherein the hardware resources portions are adapted to limit respective power consumption rates based on instructions from the system power manager.

6. The data processing system of claim 5, wherein the system power manager comprises a chassis manager and the hardware resources portions correspond to sleds hosted by a chassis in which the data processing system is positioned.

7. The data processing system of claim 1, wherein the hardware resources portions that are operating are performing the startup operation prior to handing management of the operation of the respective hardware resources portions to a management entity.

8. The data processing system of claim 7, wherein the management entity is an operating system.

9. The data processing system of claim 7, wherein a power supply that exclusively supplies power to the hardware resources portions is rated to provide less power than can be consumed by all of the hardware resources portions when all of the hardware resources portions are operating in the first startup operation mode, the first startup operation mode being a high-performance startup mode.

10. The data processing system of claim 9, wherein the power supply is further rated to provide sufficient power to power all of the hardware resources portions when all of the hardware resources portions are operating in the second startup operation mode, the second startup operation mode being a power conserving startup mode.

11. The data processing system of claim 10, wherein the modified power budget is based on the hardware resources portions operating in the low power consumption operating state.

12. A method of managing power consumption by a data processing system, the method comprising:
when a first hardware resources portion of hardware resources portions of the data processing system is starting a startup operation:
obtaining a power allocation request for the first hardware resources portion, the power allocation request indicating a quantity of power to be allocated to the first hardware resources portion;
making a determination that the power allocation request cannot be serviced without violating a power budget for the data processing system;
in response to the determination:
making a second determination that the power allocation request can be serviced while complying with a modified power budget for the data processing system;
in response to the second determination:
reconfiguring one or more existing power allocations of the power budget to obtain:
a potential power allocation sufficient to service the power allocation request without violating the modified power budget, and
the modified power budget,
wherein reconfiguring the one or more existing power allocations of the power budget comprises:
placing all currently operating ones of the hardware resources portions into a low power consumption operating state,
wherein placing all of the currently operating ones of the hardware resources portion into the low power consumption operating state comprises at least:
causing all hardware resource portions among all of the currently operating ones of the hardware resources portions that are still executing the startup operation while the first hardware resources portion is starting the startup operation to switch from executing the startup operation in a first startup operation mode to executing the startup in a second startup operation mode that reduces a speed at which the startup operation is being executed and uses less power consumption than the first startup operation mode,
wherein the hardware resources portions switch from the first startup operation mode to the second startup operation mode without pausing or stopping the startup operation; and
making a power allocation for the first hardware resources portion using the potential power allocation to:
service the power allocation request, and
obtaining a second modified power budget for the data processing system.

13. The method of claim 12, wherein reconfiguring the one or more existing power allocations comprises:
identifying a portion of power allocations specified by the power budget that may be modified to free power capacity of the power budget;
selecting a sub-portion of the portion of the power allocations based on a quantity of power to service the power allocation request;
reconfiguring operation of a portion of the hardware resources portions associated with the sub-portion of the portion of the power allocations to reduce power consumption; and
updating the power budget based on the reduced power consumption to obtain the modified power budget for the data processing system, the modified power budget indicating the potential power allocation.

14. The method of claim 12, wherein reconfiguring operation of the portion of the hardware resources portions comprises:
for a hardware resources portion of the portion of hardware resources portions:
instructing a local power manager of the hardware resources portion to consume a reduced quantity of power; and
waiting a predetermined quantity of time after the instructing or waiting until an acknowledgement indicating that the local power manager has reconfigured the hardware resources portion to consume the reduced quantity of power.

15. The method of claim 14, wherein the local power manager comprises an out of band manager that is adapted to manage power consumption by the hardware resources portion by modifying operation of hardware components of the hardware resources portion.

16. A non-transitory computer readable medium storing instructions that, when executed by a processor, cause a method for managing power consumption by a data processing system to be performed, the method comprising:
when a first hardware resources portion of hardware resources portions of the data processing system is starting a startup operation:
obtaining a power allocation request for the first hardware resources portion, the power allocation request indicating a quantity of power to be allocated to the first hardware resources portion;
making a determination that the power allocation request cannot be serviced without violating a power budget for the data processing system;
in response to the determination:
making a second determination that the power allocation request can be serviced while complying with a modified power budget for the data processing system;
in response to the second determination:
reconfiguring one or more existing power allocations of the power budget to obtain:
a potential power allocation sufficient to service the power allocation request without violating the modified power budget, and
the modified power budget,
wherein reconfiguring the one or more existing power allocations of the power budget comprises:

placing all currently operating ones of the hardware resources portions into a low power consumption operating state,
wherein placing all of the currently operating ones of the hardware resources portion into the low power consumption operating state comprises at least:
causing all hardware resource portions among all of the currently operating ones of the hardware resources portions that are still executing the startup operation while the first hardware resources portion is starting the startup operation to switch from executing the startup operation in a first startup operation mode to executing the startup in a second startup operation mode that reduces a speed at which the startup operation is being executed and uses less power consumption than the first startup operation mode,
wherein the hardware resources portions switch from the first startup operation mode to the second startup operation mode without pausing or stopping the startup operation; and
making a power allocation for the first hardware resources portion using the potential power allocation to:
service the power allocation request, and
obtaining a second modified power budget for the data processing system.

17. The non-transitory computer readable medium of claim 16, wherein reconfiguring the one or more existing power allocations comprises:
identifying a portion of power allocations specified by the power budget that may be modified to free power capacity of the power budget;
selecting a sub-portion of the portion of the power allocations based on a quantity of power to service the power allocation request;
reconfiguring operation of a portion of the hardware resources portions associated with the sub-portion of the portion of the power allocations to reduce power consumption; and
updating the power budget based on the reduced power consumption to obtain the modified power budget for the data processing system, the modified power budget indicating the potential power allocation.

18. The non-transitory computer readable medium of claim 16, wherein reconfiguring operation of the portion of the hardware resources portions comprises:
for a hardware resources portion of the portion of hardware resources portions:
instructing a local power manager of the hardware resources portion to consume a reduced quantity of power; and
waiting a predetermined quantity of time after the instructing or waiting until an acknowledgement indicating that the local power manager has reconfigured the hardware resources portion to consume the reduced quantity of power.

19. The non-transitory computer readable medium of claim 18, wherein the local power manager comprises an out of band manager that is adapted to manage power consumption by the hardware resources portion by modifying operation of hardware components of the hardware resources portion.

* * * * *